March 16, 1937.  R. N. BILLS  2,074,161
SUBSURFACE EXPLORATION
Filed Feb. 8, 1936
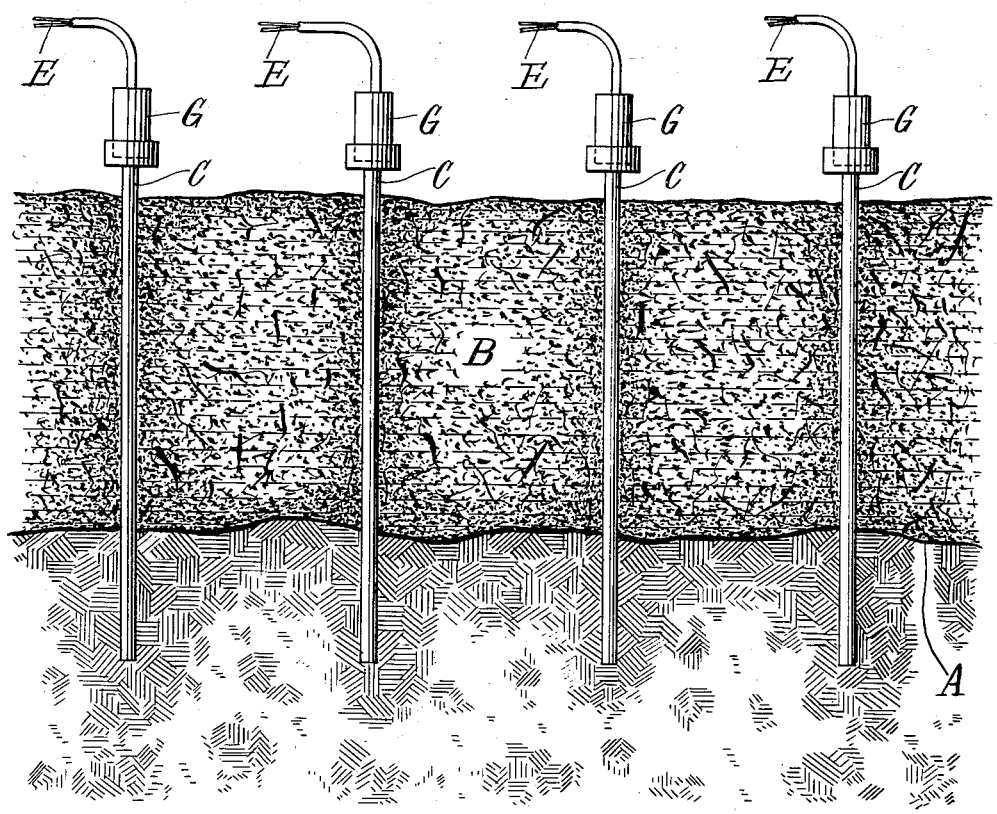
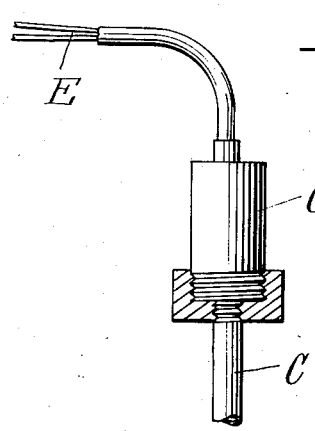
INVENTOR.
Robert N. Bills
BY Kenyon & Kenyon
ATTORNEYS.

Patented Mar. 16, 1937

2,074,161

UNITED STATES PATENT OFFICE 2,074,161

SUBSURFACE EXPLORATION

Robert N. Bills, Tulsa, Okla., assignor to Geophysical Research Corporation, New York, N. Y., a corporation of New Jersey Application February 8, 1936, Serial No. 62,893

1 Claim. (Cl. 181—0.5)

This invention relates to sub-surface exploration.

One method of sub-surface exploration involves the generation of artificial seismic waves at a point near the earth's surface and recording the reception of such waves at a plurality of adjacent points located at a substantial distance from the origin point after reflection from a sub-surface formation. In certain localities, there is a surface layer of muck or marsh land and when wave receivers, such as geophones, are placed on or in such surface layer, it is often very difficult to obtain satisfactory reflection records. One reason for this fact is that the velocity of sound in such soft material is very low and hence there is apt to be a considerable variation in the time taken for a sound wave to travel from the firm material below the surface layer to each of the individual geophones. There are methods of making corrections for this variation, but for extreme accuracy it is much better if such variations can be avoided. Also, when the geophones are placed in such soft surface material, they are subject to extraneous disturbances such as are caused by moving of vegetation on the surface.

An object of this invention is a method of receiving the reflected waves which avoids the objections above noted.

According to this invention, the geophones are supported by rods, such as iron pipes, driven through the superficial layer of soft material until the lower ends of the pipes are firmly implanted in the solid material underlying the surface layer. With this arrangement, the geophone is in effect planted in the solid material rather than in the soft surface material and considerable improvement is obtained in the character of the reflections and the variations in the time taken for the sound waves to travel from the firm material below the surface layer to each of the geophones is cut down to practically a negligible amount. Also, there is obtained a reduction in the amount of undesirable disturbance picked up by the geophones.

Other objects, novel features and advantages of this invention will become apparent from the following specification and accompanying drawing, wherein:

Fig. 1 is a schematic view illustrative of the invention, and

Fig. 2 is a view partly in section showing a manner of mounting a geophone on its support.

In the drawing, the upper surface of hard-pan or the like is designated by the reference character A while the reference character B designates a surface layer of soft material such as muck. Rods C are sunk through the layer B and have their lower ends embedded in the hard-pan. These rods may be solid or may be iron pipes of any suitable size, such for example as one inch pipe. Geophones G are rigidly fastened to the upper ends of the pipes C and cables E lead to a wave recorder (not shown). As shown in Fig. 2, the geophone G preferably is screw-threaded into a platform which is in turn screw-threaded on to the upper end of the pipe C.

The use of one inch pipe is preferred, since such pipe is light enough to be easily carried around and can be driven through the surface layer very easily. Also, such pipe can be made up of short sections which can be screwed together as the pipe is driven down. Practically any sort of clamping arrangement can be used to attach the geophone to the top of the pipe, the only requirement being that the attachment be very rigid. The length of the pipe is not critical within very wide limits and the depth to which it is driven in the hardpan seems to be immaterial so long as the pipe is driven in far enough to make a firm contact so that the pipe will move when the hard-pan is vibrated by the oncoming artificial seismic wave. Usually, it is necessary only to use pipes from 20 to 30 feet in length, but longer pipes can be used where the surface layer is of greater depth. It is necessary only to have the pipe long enough to extend through the surface layer and a few feet into the hard-pan material.

The waves reflected from a sub-surface formation are transmitted through the pipe C to the geophones G by which they are translated into electrical impulses in the usual manner, such electrical impulses being impressed on the recorder to produce a record of the received waves. The seismic waves received by the geophones are generated at a point of origin in the same way as heretofore. The rods C can be composed of any suitable rigid material but preferably are constituted of iron pipe but it is to be understood that in the claim the word "rod" is used to describe any smooth surface support composed of rigid material.

I claim:

The method of receiving artificial seismic waves transmitted through earth having a surface layer of soft material which comprises sinking a rod through the soft surface layer into the hard material therebelow, mounting a wave detector on the upper end of said rod and receiving by said detector the waves transmitted thereto from the hard material through said rod.

ROBERT N. BILLS.